(12) United States Patent
Dykstra et al.

(10) Patent No.: US 10,787,896 B2
(45) Date of Patent: Sep. 29, 2020

(54) METHOD AND SYSTEM FOR DISTRIBUTED CONTROL OF DRILLING OPERATIONS

(71) Applicant: HALLIBURTON ENERGY SERVICES, INC., Houston, TX (US)

(72) Inventors: Jason D. Dykstra, Spring, TX (US); Yuzhen Xue, Tulsa, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 430 days.

(21) Appl. No.: 15/576,023

(22) PCT Filed: Feb. 18, 2016

(86) PCT No.: PCT/US2016/018469
§ 371 (c)(1),
(2) Date: Nov. 21, 2017

(87) PCT Pub. No.: WO2017/142538
PCT Pub. Date: Aug. 24, 2017

(65) Prior Publication Data
US 2018/0156023 A1  Jun. 7, 2018

(51) Int. Cl.
*E21B 44/04* (2006.01)
*E21B 44/00* (2006.01)
(Continued)

(52) U.S. Cl.
CPC .............. *E21B 44/04* (2013.01); *E21B 7/04* (2013.01); *E21B 21/08* (2013.01); *E21B 44/00* (2013.01);
(Continued)

(58) Field of Classification Search
CPC .......... E21B 49/00; E21B 49/04; E21B 21/08; E21B 21/065
See application file for complete search history.

(56) References Cited

U.S. PATENT DOCUMENTS

2012/0109382 A1  5/2012 Dashevskiy et al.
2013/0127900 A1  5/2013 Pena et al.
(Continued)

FOREIGN PATENT DOCUMENTS

WO  2008139171 A2  11/2008
WO  WO-2014011171 A1 * 1/2014 ......... E21B 41/0092
(Continued)

OTHER PUBLICATIONS

International Search Report and Written Opinion; PCT Application No. PCT/US2016/018469; dated Nov. 9, 2016.
(Continued)

*Primary Examiner* — Michael J Dalbo
(74) *Attorney, Agent, or Firm* — Polsinelli PC

(57) ABSTRACT

A system including a plurality of subsystems each of which includes a subsystem controller coupled with a sensor configured to obtain a measurement, an actuator, and a subsystem processor. The subsystem processor includes a first memory storing instructions to identify a subsystem state and generate a subsystem performance objective based on the subsystem state. The system also includes a global processor coupled with each of the subsystems, the global processor includes a second memory storing instructions to identify a global system state based on the subsystem state of each subsystem, generate a global performance objective, calculate an updated performance objective for each subsystem, and transmit the updated performance objective to each subsystem. Once received, the subsystem controller in each subsystem activates the actuator to adjust a subsystem parameter to meet the updated performance objective.

20 Claims, 11 Drawing Sheets

(51) Int. Cl.
*E21B 7/04* (2006.01)
*E21B 21/08* (2006.01)
*E21B 49/00* (2006.01)
*G05B 19/042* (2006.01)
*E21B 47/13* (2012.01)
*E21B 21/06* (2006.01)
*E21B 47/06* (2012.01)
*E21B 47/18* (2012.01)

(52) U.S. Cl.
CPC .......... *E21B 49/00* (2013.01); *G05B 19/0426* (2013.01); *E21B 21/065* (2013.01); *E21B 47/06* (2013.01); *E21B 47/13* (2020.05); *E21B 47/18* (2013.01); *G05B 2219/45129* (2013.01)

(56) References Cited

U.S. PATENT DOCUMENTS

2014/0090888 A1* 4/2014 Smith .................. E21B 21/106
175/38

2014/0110106 A1 4/2014 Fripp et al.
2015/0105912 A1 4/2015 Dykstra
2015/0275646 A1* 10/2015 Benson ................. E21B 47/024
700/275

FOREIGN PATENT DOCUMENTS

| WO | 2015030820 A1 | 3/2015 |
| WO | 2015057242 A1 | 4/2015 |
| WO | 2015084402 A1 | 6/2015 |
| WO | 2015084405 A1 | 6/2015 |
| WO | 2015102792 A1 | 7/2015 |
| WO | 2015137931 A1 | 9/2015 |

OTHER PUBLICATIONS

B.T. Stewart, et al., Cooperative distributed model predictive control, Systems & Control Letters (2010), doi:10.1016/j.sysconle.2010.06.005.

* cited by examiner

METHOD AND SYSTEM FOR DISTRIBUTED CONTROL OF DRILLING OPERATIONS

CROSS-REFERENCE TO RELATED APPLICATIONS

This application is a national stage entry of PCT/US2016/018469 filed Feb. 18, 2016, said application is expressly incorporated herein in its entirety.

FIELD

The present disclosure generally relates to methods and systems for distributed control among a plurality of systems. In particular, the subject matter herein relates to a coordination of localized and distributed control among a plurality of systems in drilling operations.

BACKGROUND

Wellbores can be drilled into the earth for a variety of purposes including tapping into hydrocarbon bearing formations to extract the hydrocarbons for use as fuel, lubricants, chemical production, and other purposes. Systems for drilling subterranean wellbores can be complex, often involving multiple subsystems. These systems must work in conjunction in order to maintain a functioning well. The drilling subsystems may include, for instance, a rig subsystem, a drilling fluid subsystem, and a bottom hole assembly (BHA) subsystem. Each drilling subsystem typically collects measurements from sensors to detect various parameters related to the drilling process. Drilling systems are generally characterized by subsystem equipment and measurement devices spread over large distances, which involve communication delays and bandwidth issues.

Several parameters can affect the drilling operations including drilling speed, mud equivalent circulating density (ECD) and path orientation. Many control methods can control an individual subsystem based on the above parameters. During the process, several of the systems may pull from the same power source. Each system is controlled internally, such that the individual systems can update or change their functions based on different parameters.

BRIEF DESCRIPTION OF THE DRAWINGS

Implementations of the present technology will now be described, by way of example only, with reference to the attached figures, wherein.

DETAILED DESCRIPTION

Figure 1:
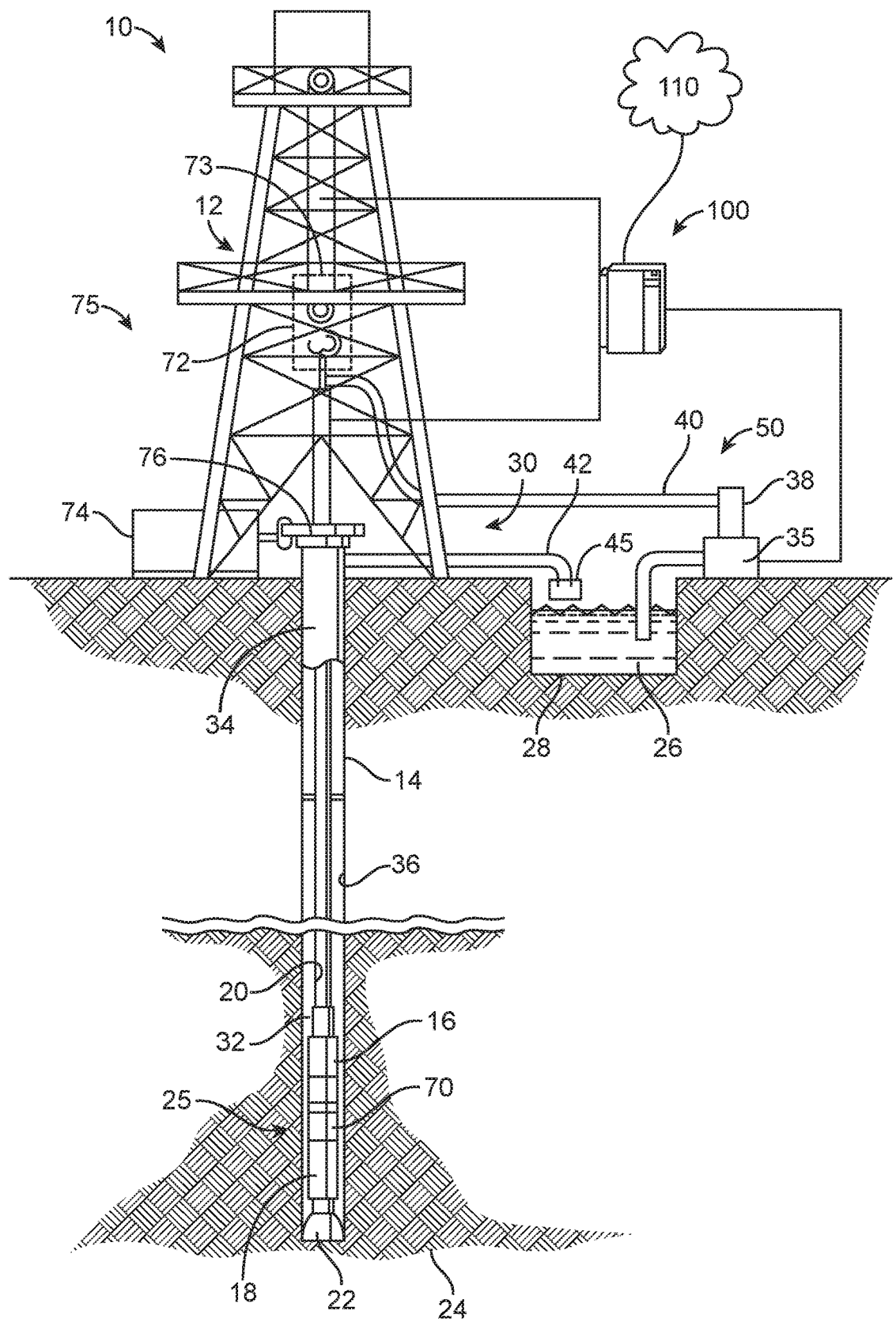
FIG. 1 is a diagram illustrating an exemplary drilling system according to the disclosure herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The terms "comprising," "including," and "having" are used interchangeably in this disclosure. The terms "comprising," "including," and "having" mean to include, but not necessarily be limited to, the things so described.

Disclosed herein are a method and a system for combining localized and distributed control of a drilling system having a smart communication device. Real time data is obtained from each of a plurality of subsystems, each of which is controlled by a subsystem controller configured to maximize a predetermined parameter of each subsystem. Each subsystem can transmit data to a global processor configured to maximize a predetermined parameter of the entire drilling system based at least on the data compiled from each of the subsystems. The global processor can generate an updated performance objective for each of the subsystems. The updated performance objective can be independent from the local subsystem performance objective. The updated performance objective can be configured to prevent detrimental competition for use of the resources by one or more subsystems. The updated performance objectives can be transmitted to the subsystem controllers for each subsystem, the subsystem controllers can then adjust the subsystem actuator to meet the performance objective.

FIG. 1 illustrates a diagram of an exemplary embodiment of a wellbore operating environment 10 in which a drilling control apparatus, method, and system may be deployed in accordance with certain embodiments of the present disclosure. The wellbore operating environment 10 includes a plurality of drilling subsystems. For example, FIG. 1 depicts the wellbore operating environment 10 as including a bottom hole assembly (BHA) subsystem 25, drilling fluid system 50, and a rig subsystem 75. However, the wellbore operating environment 10 may include any number of subsystems. Additionally, each of the subsystems illustrated in FIG. 1 may be further divided into additional subsystems, or may themselves be included in other subsystems, without departing from the scope and spirit of the present disclosure.

As depicted in FIG. 1, the wellbore operating environment 10 may include a drilling rig 12 positioned above a borehole 14. The drilling rig 12 includes a drill string 20 disposed within the borehole 14. A BHA subsystem 25 is located at the downhole end of the drill string 20. The BHA subsystem 25 includes a drill bit 22 that penetrates the earth formation 24 to form a borehole 14. The BHA subsystem 25 further includes a fluid-driven motor assembly 70 that drives drill bit 22. The BHA subsystem 25 may provide directional control of the drill bit 22. In at least one aspect of the present disclosure, the drill bit 22 is a rotatable drill bit and the BHA subsystem is a steerable BHA subsystem 25 including a Measurement While Drilling (MWD) system with various sensors 18 to provide information about the earth formations 24 and downhole drilling parameters. The MWD sensors in the BHA subsystem 25 may include, but are not limited to, a device for measuring the formation resistivity near the drill bit, a gamma ray device for measuring the formation gamma ray intensity, devices for determining the inclination and azimuth of the drill string, and pressure sensors for measuring drilling fluid pressure downhole. The MWD may also include additional/alternative sensing devices for measuring shock, vibration, torque, telemetry, etc. The BHA subsystem 25 may further include actuators capable of steering the drill bit 22 or otherwise adjusting the path direction of the drill bit 22 and drill string 20. In at least one aspect of the present disclosure, the BHA subsystem 25 includes a subsystem controller capable of processing data obtained from sensors 18. The subsystem controller can adjust the path direction of the drill bit 22 and drill string 20 in response to the data by sending a command signal to one or more actuators capable of adjusting the parameter. The sensors 18 may transmit data through a subsystem controller to a global processor 100 on the earth's surface using telemetry such as conventional mud pulse telemetry systems or any wired, fiber optic, or wireless communication system. The global processor 100 can include any suitable computer, controller, or data processing apparatus capable of being programmed to carry out the method and apparatus as further described herein. As such, the global processor 100 can process the sensor data in accordance with the embodiments of the present disclosure as described herein.

In the alternative, the global processor 100 can transmit the data to another location for processing. For example, the global processor 100 can be communicatively coupled with each of the subsystems via the subsystem controllers and a network 110. The network 110 can be any network for transmitting and receiving data from the subsystems, such as, a local area network (LAN), wide area network (WAN), and telephone network, such as a Public Switched Telephone Network (PTSN), an intranet, the Internet, or combinations thereof. In at least one aspect of the present disclosure, the network 110 can be a telemetry network, such as a mud pulse telemetry network, an electromagnetic telemetry network, a wired pipe network, fiber optics, a pipe-in-pipe network, an acoustic telemetry network, a torsion telemetry network, or combinations thereof. In the alternative, the network 110 can be a combination of traditional or telemetry networks.

The global processor 100 can receive measurement data and subsystem state information from one or more subsystem controllers. As used herein, "subsystem state" refers to a time-dependent subsystem state or set of subsystem states that can be directly measured by a sensor or calculated or estimated, at least in part, from one or more sensor measurements. The global processor 100 can also transmit instructions to each of the subsystem controllers. In at least one aspect of the present disclosure, the global processor 100 can send instructions to each of the subsystem controllers sufficient to coordinate control of the drilling subsystems during drilling operations.

Additionally, network 110 can facilitate communication with servers or other shared data systems. For example, the global processor 100 can share subsystem sensor measurement data, subsystem controller actions, and subsystem state information with servers, computers, or devices over network 110.

In at least one aspect of the present disclosure, the BHA subsystem 25 can include a Logging While Drilling (LWD) System with additional sensors or logging tools 16. The logging tools, sensors, or instruments 16, can be any conventional logging instrument, such as acoustic (sonic), neutron, gamma ray, density, photoelectron, nuclear magnetic resonance, or any other conventional logging instrument, or combinations thereof, which can be used to measure lithology or porosity of earth formations surrounding the borehole 14. The sensors or logging tools 16 can transmit data to the global processor 100 through the subsystem controllers using telemetry such as those discussed above. As stated above, the global processor 100 can process the sensor data or transmit the data for processing at another location.

The BHA subsystem 25 can also include additional sensors in conjunction with the fluid-driven motor 70 that can monitor the revolutions per minute (RPM) of the motor 70 and identify changes in torque or power required to maintain constant rotation, such as a torque meter. Such sensors may be internal or external to the fluid-driven motor 70.

In addition to MWD sensors, LWD sensors, and instrumentation, wireline instrumentation can also be used in conjunction with the BHA subsystem 25. The wireline instrumentation can include any conventional logging instrumentation which can be used to measure the lithology and/or porosity of earth formations surrounding a borehole, for example, acoustic, neutron, gamma ray, density, photoelectric, nuclear magnetic resonance, or any other conventional logging instrument, or combinations thereof.

As depicted in FIG. 1, a mud circulation subsystem, or drilling fluid subsystem, 50 can pump drilling mud 26 via pumps 38 from a storage reservoir pit 28 near the wellhead 30, down an axial passageway (not illustrated) through the drill string 20, through the fluid-driven motor assembly 70, and out of a plurality of apertures within the drill bit 22. As used herein, the term "drilling mud" may be used interchangeably with "drilling fluid" to refer to both drilling mud alone and a mixture of drilling mud and formation cuttings, or alternatively, to refer to both drilling fluid alone and a mixture of drilling fluid and formation cuttings. The drilling mud 26 the flows back to the surface through the annular region 32 between the drill string 20 and the sidewalls 36 of the borehole 14. A metal casing 34 may be positioned in the borehole 14 above the drill bit 22 configured to maintain the integrity of the upper portion of the borehole 14 and prevent fluid transmission (such as drilling mud 26) between borehole 14 and earth formation 24.

The drilling fluid subsystem 50 can include one or more sensors capable of measuring the pumping rate or the downhole drilling fluid flow rate. The drilling fluid subsystem 50 can include one or more actuators configured to adjust parameters with respect to pump 38, including, but not limited to, pump rate and the drilling fluid flow rate. The drilling mud can travel through a mud supply line 40 which is coupled with a central passageway extending throughout the length of the drill string 20 and exits through apertures in the drill bit 22 to cool and lubricate the drill bit 22 and carry formation cuttings to the surface. The cuttings and mud mixture pass through a fluid exhaust conduit 42, coupled with the annular region 32 at the well head 30, into a trough system 45 that can include shakers and a centrifuge (not shown). The shakers can separate a majority of solids, such as cuttings and fines, from the drilling mud 26. The cleaned mud is then returned to the mud storage pit 28.

The drilling fluid subsystem 50 can include sensors in the trough system 45 configured to analyze the nature as well as the volume, quantity, or weight of the cuttings and fines being removed from the well. Additionally, the drilling fluid subsystem 50 may include sensors configured to determine the particle size distribution (PSD), density, and/or visual characteristics of the cuttings. For example, the drilling fluid subsystem 50 may include sensors capable of determining whether the cuttings are being efficiently removed from the borehole 14. The drilling fluid subsystem 50 can include actuators configured to adjust or control the performance of the shakers and centrifuges. For example, the actuators can control shaker parameters such as screen desk angle, vibration, G-force, and mud equivalent circulating density (ECD).

The drilling fluid subsystem 50 can further include one or more sensors configured to determine fluid properties of the drilling mud. The drilling fluid subsystem 50 can also include one or more mixers 35 to mix mud obtained from the mud storage pit with appropriate additives. For example, the mixers 35 can control the rheological properties of the drilling fluid as well as the density, electrical stability, percent solids, oil/water ratio, acidity (pH), salinity, and particle size distribution. The drilling fluid subsystem 50 can include one or more actuators to control the properties of the drilling fluid. For example, the actuators can control additive supply valves, feed rates, mixture composition, discharge rates, and other aspects of the mixing process.

As described above, the wellbore operating environment 10 can further include a rig subsystem 75. The rig subsystem 75 can include a top drive motor 72, a draw works 73, a rotary table 76, and a rotary table motor 74. The rotary table motor 74 can rotate the drill string 20 or, in the alternative, the drill string 20 can be rotated via the top drive motor 72. The rig subsystem 75, at least in part, drives the drill bit 22 by providing sufficient weight-on-bit (WOB), revolutions per minute (RPM) and torque to create the borehole 14. The rig subsystem 75 can include one or more sensors to measure, for instance, RPM, WOB, torque-on-bit (TOB), rate of penetration (ROP), well depth, hook load, and standpipe pressure. Additionally, the rig subsystem 75 can include actuators to adjust or control the above described drilling parameters.

Although FIG. 1 generally depicts a vertical wellbore, it would be obvious to those skilled in the art that the present disclosure is equally well suited for use in wellbores having other orientations including horizontal wellbores, slanted wellbores, multilateral wellbores or the like. Additionally, even though FIG. 1 depicts an onshore operation, the present disclosure is equally well-suited for use in offshore operations. Offshore oil rigs that can be used in accordance with the present disclosure include, but are not limited to, floaters, fixed platforms, gravity-based structures, drillships, semi-submersible platforms, jack-up drilling rigs, tension-leg platforms, and the like. The present disclosure is also suited for use in rigs ranging anywhere from small in size and portable to bulky and permanent.

Although shown and described with respect to a rotary drill system in FIG. 1, many types of drills can be employed in carrying out embodiments of the invention including, but not limited to, Auger drills, air core drills, cable tool drills, diamond core drills, percussion rotary air blast (RAB) drills, reverse circulation drills, and the like. Additionally, the present disclosure is suited for use in any drilling operation that generates a subterranean borehole. For example, the present disclosure is suited for drilling for hydrocarbon or mineral exploration, environmental investigations, natural gas extraction, underground instillation, mining operations, water wells, geothermal wells, and the like.

Figure 2:
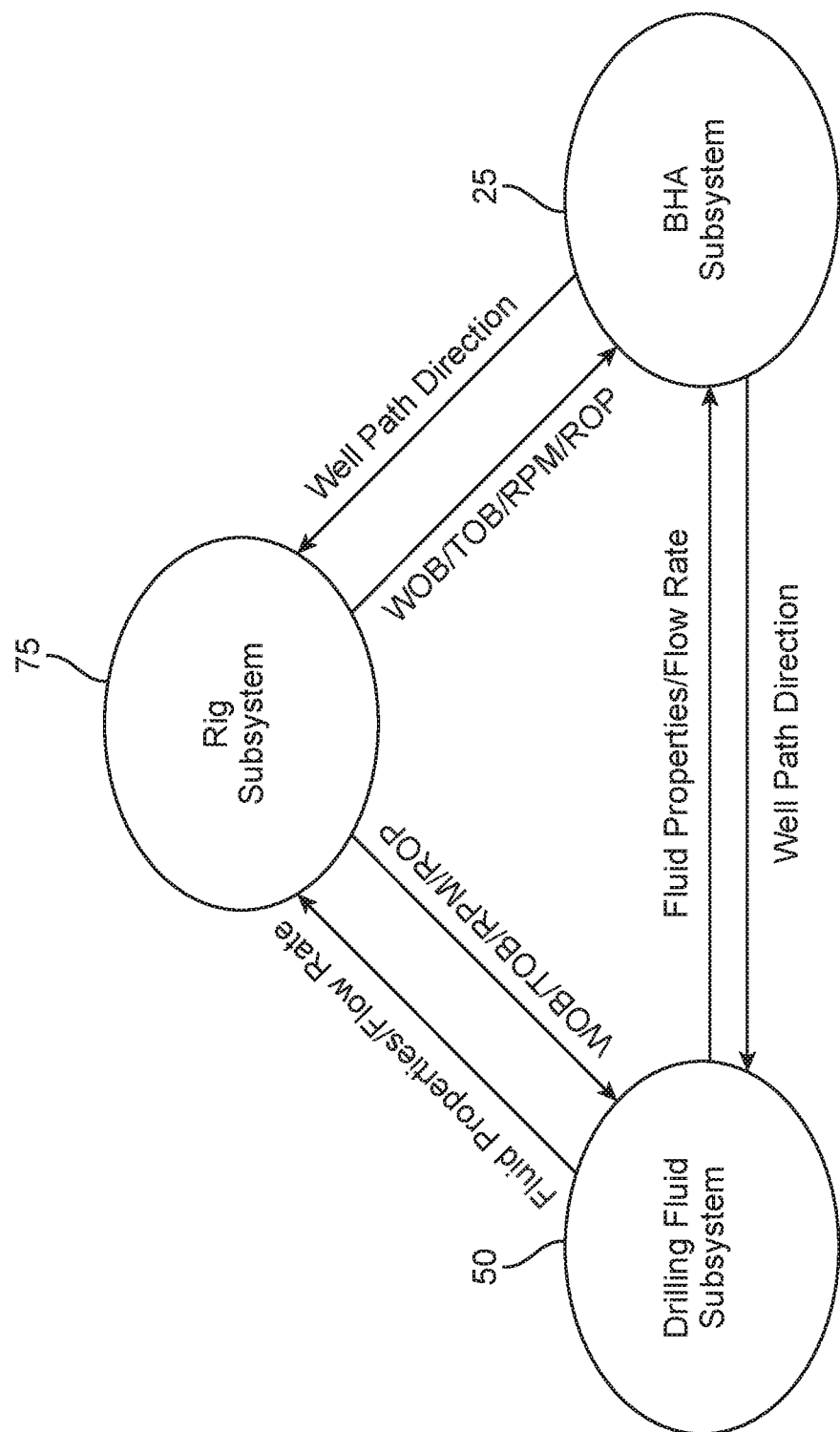
FIG. 2 is a diagram illustrating the interactions between drilling subsystems, according to the disclosure herein.

An exemplary interaction between the above described drilling systems is detailed in FIG. 2. As depicted in FIG. 2, control actions taken by any of the individual drilling subsystems can affect the performance of one or more other drilling subsystems. For example, the drilling fluid subsystem 50 provides drilling mud that is circulated downhole to cool the drill bit and transport the cuttings to the surface for disposal. The drilling fluid subsystem 50 includes a mud conditioning system to process the circulated drilling fluid with shakers, centrifuges, and other cutting removal equipment. Before the drilling fluid is recirculated, make-up water and other additives can be added to the drilling fluid to obtain the desired density and rheological profile. As such, the drilling fluid subsystem 50 directly determines the drilling fluid flow rate (downhole pumping rate) and the properties of the drilling fluid (for example, the rate of additive or make-up water added to the system). The drilling fluid properties and downhole drilling fluid flow rate can affect the performance and control parameters of the rig 75 and BHA 25 subsystems. For example, the drilling fluid properties and flow rate can determine in part the ability of the BHA subsystem 25 to effectively control the well path direction. The drilling fluid properties and flow rate can also affect the rig subsystem control parameters, such as WOB, TOB, or RPM, necessary to create the borehole or achieve the desired ROP.

Similarly, a change in the well path direction, controlled by the BHA subsystem 25, can require changes in the drilling fluid properties or flow rate, controlled by the drilling fluid subsystem 50. The well path direction (controlled by the BHA subsystem 25) can additionally affect the rig subsystem 75 control decisions. Likewise, the manipulation of rig subsystem 75 variables, such as WOB and RPM, can affect the control behaviors of the BHA subsystem 25 and the drilling fluid subsystem 50.

Referring back to FIG. 1, each subsystem can include a subsystem controller that is communicatively coupled with at least one subsystem sensor and at least one subsystem actuator. The subsystem controller can receive measurement data collected by subsystem sensors and determine a local subsystem state based in part on the measurements received from the subsystem sensors. Additionally, the subsystem controller can send command signals to the subsystem actuators and cause the actuators to adjust one or more drilling parameter. For example, the actuators can convert the command signals from subsystem controllers into actions such as movement of a control valve shaft or the change of speed of a pump. The command signals can include, but are not limited to, electrical, pneumatic, hydraulic, acoustic, electromagnetic radiation, and various combinations thereof. The actuators can be of various kinds, including, but not limited to, variable speed motors, variable speed drives, pneumatic actuators, electrical actuators, hydraulic actuators, rotary actuators, servo motor actuators, and various combinations thereof. In some cases, the subsystem controller can send command signals to a lower level controller configured to activate an actuator to adjust a subsystem parameter. The lower level controllers can be relatively simple controllers such as a proportional-integral-derivative (PID) type controller or a control loop feedback mechanism controller.

Figure 3A:
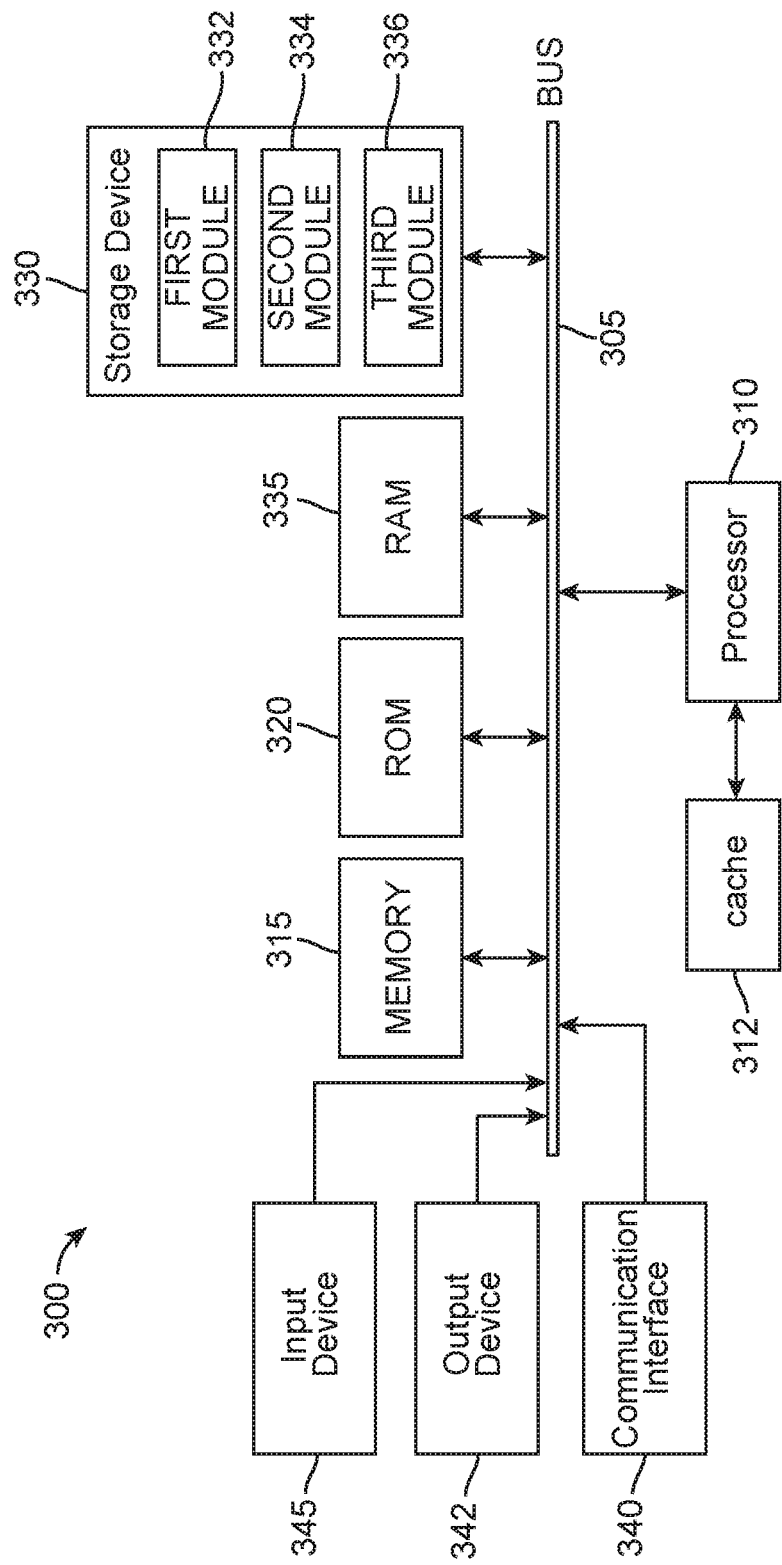
FIG. 3A illustrates an exemplary system embodiment according to the disclosure herein.
Figure 3B:
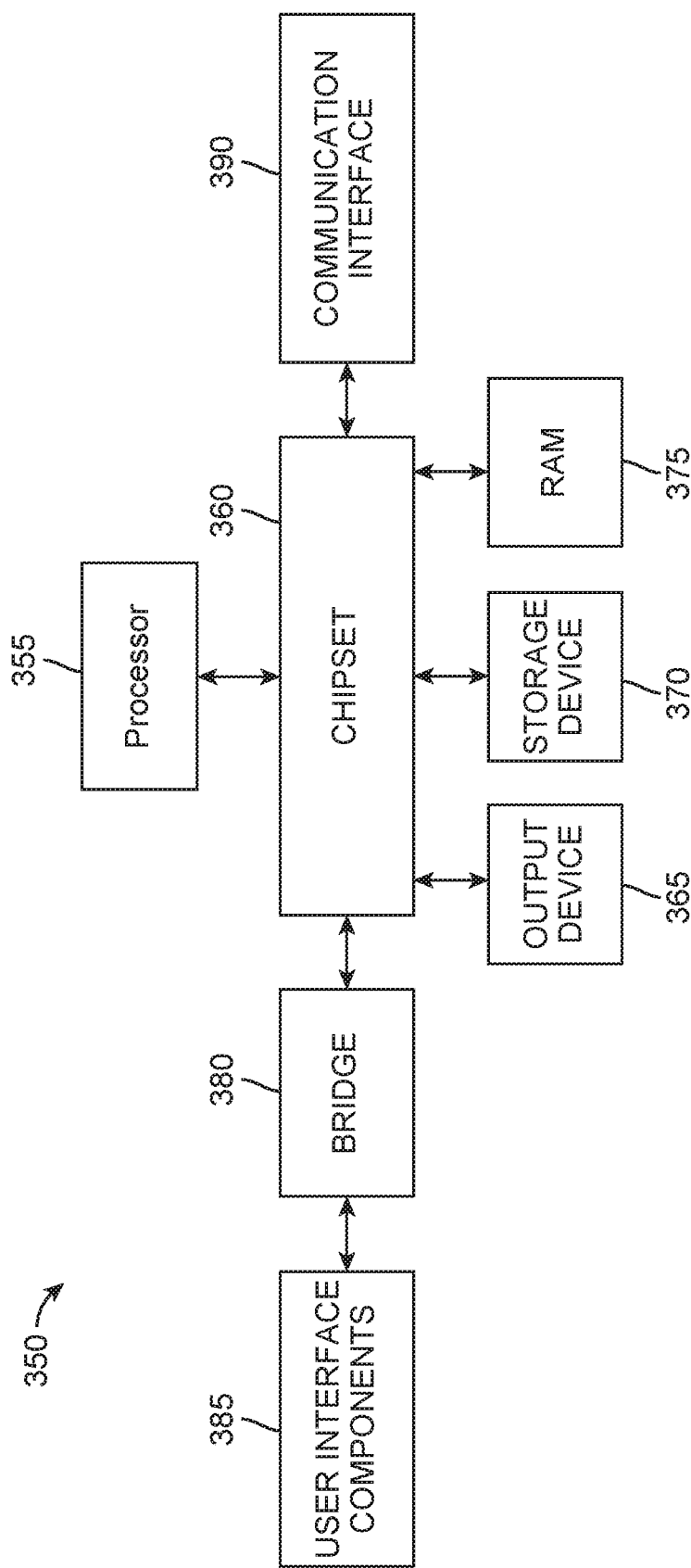
FIG. 3B illustrates a second exemplary system embodiment according to the disclosure herein.

The subsystem controller can include any suitable computer, controller, or data processing apparatus capable of being programmed to carry out the method and apparatus as further described herein. FIGS. 3A and 3B illustrate exemplary subsystem controller embodiments which can be employed to practice the concepts, methods, and techniques disclosed herein. The more appropriate embodiment will be apparent to those of ordinary skill in the art when practicing the present technology. Persons of ordinary skill in the art will also readily appreciate that other system embodiments are possible.

FIG. 3A illustrates a conventional system bus computing system architecture 300 wherein the components of the system are in electrical communication with each other using a bus 305. System 300 can include a processing unit (CPU or processor) 310 and a system bus 305 that couples various system components including the system memory 315, such as read only memory (ROM) 320 and random access memory (RAM) 335, to the processor 310. For example, the global processor of FIG. 1 can be a form of this processor 310. The system 300 can include a cache of high-speed memory connected directly with, in close proximity to, or integrated as part of the processor 310. The system 300 can copy data from the memory 315 and/or the storage device 330 to the cache 312 for quick access by the processor 310. In this way, the cache 312 can provide a performance boost that avoids processor 310 delays while waiting for data. These and other modules can control or be configured to control the processor 310 to perform various actions. Other system memory 315 may be available for use as well. The memory 315 can include multiple different types of memory with different performance characteristics. It can be appreciated that the disclosure may operate on a computing device 300 with more than one processor 310 or on a group or cluster of computing devices networked together to provide greater processing capability. The processor 310 can include any general purpose processor and a hardware module or software module, such as a first module 332, a second module 334, and third module 336 stored in storage device 330, configured to control the processor 310 as well as a special-purpose processor where software instructions are incorporated into the actual processor design. The processor 310 may essentially be a completely self-contained computing system, containing multiple cores or processors, a bus, memory controller, cache, etc. A multi-core processor may be symmetric or asymmetric.

The system bus 305 may be any of several types of bus structures including a memory bus or a memory controller, a peripheral bus, and a local bus using any of a variety of bus architectures. A basic input/output (BIOS) stored in ROM 320 or the like, may provide the basic routine that helps to transfer information between elements within the computing device 300, such as during start-up. The computing device 300 further includes storage devices 330 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 330 can include software modules 332, 334, 336 for controlling the processor 310. The system 300 can include other hardware or software modules. The storage device 330 is connected to the system bus 305 by a drive interface. The drives and the associated computer-readable storage devices provide non-volatile storage of computer-readable instructions, data structures, program modules and other data for the computing device 300. In one aspect, a hardware module that performs a particular function includes the software components shorted in a tangible computer-readable storage device in connection with the necessary hardware components, such as the processor 310, bus 305, and so forth, to carry out a particular function. In the alternative, the system can use a processor and computer-readable storage device to store instructions which, when executed by the processor, cause the processor to perform operations, a method or other specific actions. The basic components and appropriate variations can be modified depending on the type of device, such as whether the device 300 is a small, handheld computing device, a desktop computer, or a computer server. When the processor 310 executes instructions to perform "operations", the processor 310 can perform the operations directly and/or facilitate, direct, or cooperate with another device or component to perform the operations.

To enable user interaction with the computing device 300, an input device 345 can represent any number of input mechanisms, such as a microphone for speech, a touch-sensitive screen for gesture or graphical input, keyboard, mouse, motion input, speech and so forth. An output device 342 can also be one or more of a number of output mechanisms known to those of skill in the art. In some instances, multimodal systems can enable a user to provide multiple types of input to communicate with the computing device 300. The communications interface 340 can generally govern and manage the user input and system output. There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks (DVDs), cartridges, RAMs 325, ROM 320, a cable containing a bit stream, and hybrids thereof.

The logical operations of the various embodiments are implemented as: (1) a sequence of computer implemented steps, operations, or procedures running on a programmable circuit with a general use computer, (2) a sequence of computer implemented steps, operations, or procedures running on a specific-use programmable circuit; and/or (3) interconnected machine modules or program engines within the programmable circuits. The system 300 shown in FIG. 3A can practice all or part of the recited methods, can be a part of the recited systems, and/or can operate according to instructions in the recited tangible computer-readable storage devices.

One or more parts of the example computing device 300, up to and including the entire computing device 300, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 310 can include all types of processors disclosed herein, including a virtual processor. However, when referring to a virtual processor, the processor 310 includes the software components associated with executing the virtual processor in a virtualization layer and underlying hardware necessary to execute the virtualization layer. The system 300 can include a physical or virtual processor 310 that receives instructions stored in a computer-readable storage device, which causes the processor 310 to perform certain operations. When referring to a virtual processor 310, the system also includes the underlying physical hardware executing the virtual processor 310.

FIG. 3B illustrates an example computer system 350 having a chipset architecture that can be used in executing the described method and generating and displaying a graphical user interface (GUI). Computer system 350 can be computer hardware, software, and firmware that can be used to implement the disclosed technology. System 350 can include a processor 355, representative of any number of physically and/or logically distinct resources capable of executing software, firmware, and hardware configured to perform identified computations. Processor 355 can communicate with a chipset 360 that can control input to and output from processor 355. Chipset 360 can output information to output device 365, such as a display, and can read and write information to storage device 370, which can include magnetic media, and solid state media. Chipset 360 can also read data from and write data to RAM 375. A bridge 380 for interfacing with a variety of user interface components 385 can include a keyboard, a microphone, touch detection and processing circuitry, a pointing device, such as a mouse, and so on. In general, inputs to system 350 can come from any of a variety of sources, machine generated and/or human generated.

Chipset 360 can also interface with one or more communication interfaces 390 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 355 analyzing data stored in storage 370 or RAM 375. Further, the machine can receive inputs from a user via user interface components 385 and execute appropriate functions, such as browsing functions by interpreting these inputs using processor 355.

It can be appreciated that systems 300 and 350 can have more than one processor 310, 355 or be part of a group or cluster of computing devices networked together to provide processing capability. For example, the processor 310, 355 can include multiple processors, such as a system having multiple, physically separate processors in different sockets, or a system having multiple processor cores on a single physical chip. Similarly, the processor 310 can include multiple distributed processors located in multiple separate computing devices, but working together such as via a communications network. Multiple processors or processor cores can share resources such as memory 315 or the cache 312, or can operate using independent resources. The processor 310 can include one or more of a state machine, an application specific integrated circuit (ASIC), or a programmable gate array (PGA) including a field PGA.

Methods according to the aforementioned description can be implemented using computer-executable instructions that are stored or otherwise available from computer readable media. Such instructions can comprise instructions and data which cause or otherwise configured a general purpose computer, special purpose computer, or special purpose processing device to perform a certain function or group of functions. portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software. The functions these blocks represent may be provided through the use of either shared or dedicated hardware, including, but not limited to, hardware capable of executing software and hardware, such as a processor 310, that is purpose-built to operate as an equivalent to software executing on a general purpose processor. For example, the functions of one or more processors represented in FIG. 3A may be provided by a single shared processor or multiple processors. (Use of the term "processor" should not be construed to refer exclusively to hardware capable of executing software). Illustrative embodiments may include microprocessor and/or digital signal processor (DSP) hardware, ROM 320 for storing software performing the operations described below, and RAM 335 for storing results. Very large scale integration (VLSI) hardware embodiments, as well as custom VLSI circuitry in combination with a general purpose DSP circuit, may also be provided.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Figure 4:
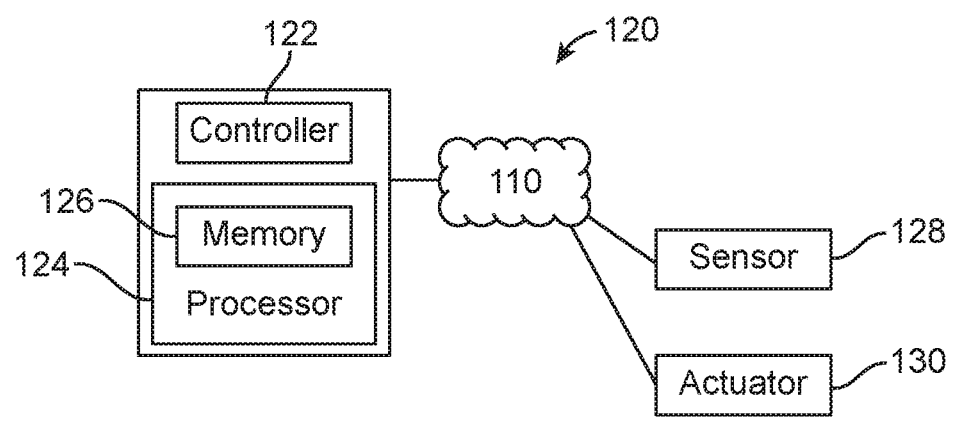
FIG. 4 is a block diagram illustrating an exemplary subsystem, according to the disclosure herein.

A general subsystem 120 according to the disclosure herein is illustrated in FIG. 4. The subsystem 120 can contain a subsystem controller 122 coupled with a processor 124, wherein the processor further comprises a memory 126. The subsystem controller 122 is further communicatively coupled with a sensor 128 and an actuator 130 via a network 110. The network 110 can be any network capable of transmitting and receiving data, as described in detail above with respect to FIG. 1. While FIG. 4 generally depicts a subsystem 120 having a single sensor 128 and a single actuator 130, it should be obvious to those skilled in the art that the subsystem can include any number of sensors or actuators without departing from the disclosure.

Figure 5:
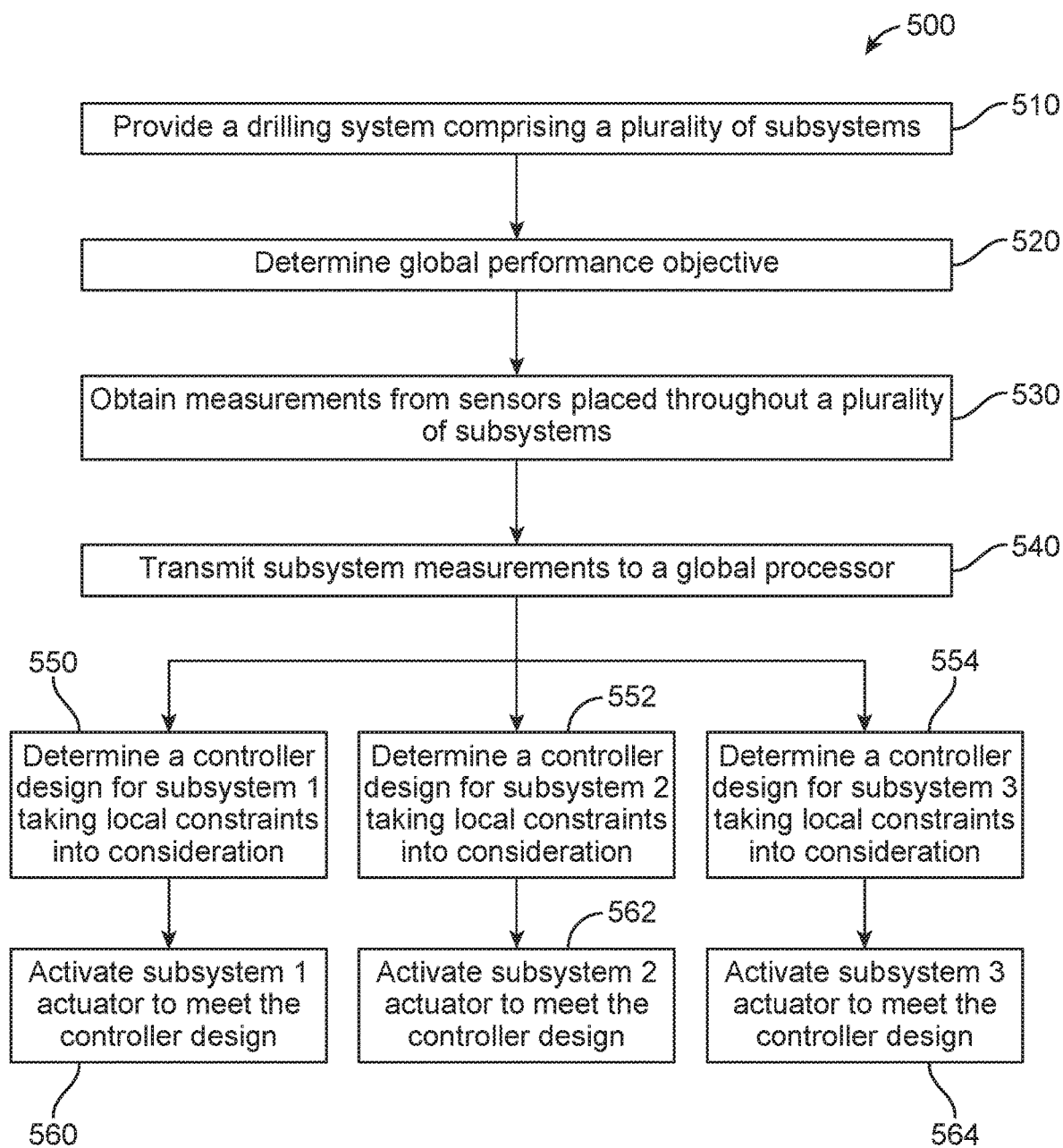
FIG. 5 is a flow chart illustrating a method for distributed control throughout a drilling system.

A method for distributed control of a drilling system, such as the one described above with respect to FIGS. 1-4, can follow the method 500 as depicted in FIG. 5. For example, beginning at block 510, a drilling system is provided comprising a plurality of subsystems throughout the drilling system. While the illustrate example shows a drilling system comprising three subsystems, it should be noted that any number of subsystems can be present. At block 520, a global processor determines a global performance objective for the drilling system as a whole. The global performance objective can be based, at least in part, on the optimization of any number of goals, for example, cost minimization or equipment life extension.

At block 530, a plurality of measurements is obtained from each of the plurality of sensors at different points throughout the drilling system. Each of the measurements can be related to a different subsystem, or a different parameter within a subsystem. At block 540, the measurements obtained are transmitted to a global processor. At block 550, the global processor determines a controller design for subsystem 1. The controller design can be, but is not limited to, a Model Predictive Control (MPC). The controller design can take into account local constraints of subsystem 1 as well as the real-time physical inputs for each of the subsystems, such that the controller design is specific to subsystem 1. At block 560, the controller design is transmitted to the subsystem controller of subsystem 1, such that the subsystem controller can activate the subsystem 1 actuator in order to bring the subsystem into compliance with the received controller design.

Similarly, at block 552 a controller design for subsystem 2 is determined, taking into account the local constraints of subsystem 2. At block 562, the subsystem controller of subsystem 2 receives the controller design and activates the subsystem 2 actuator in order to bring the subsystem into compliance with the controller design. The same occurs with respect to subsystem 3 at blocks 554 and 564, respectively.

Figure 6:
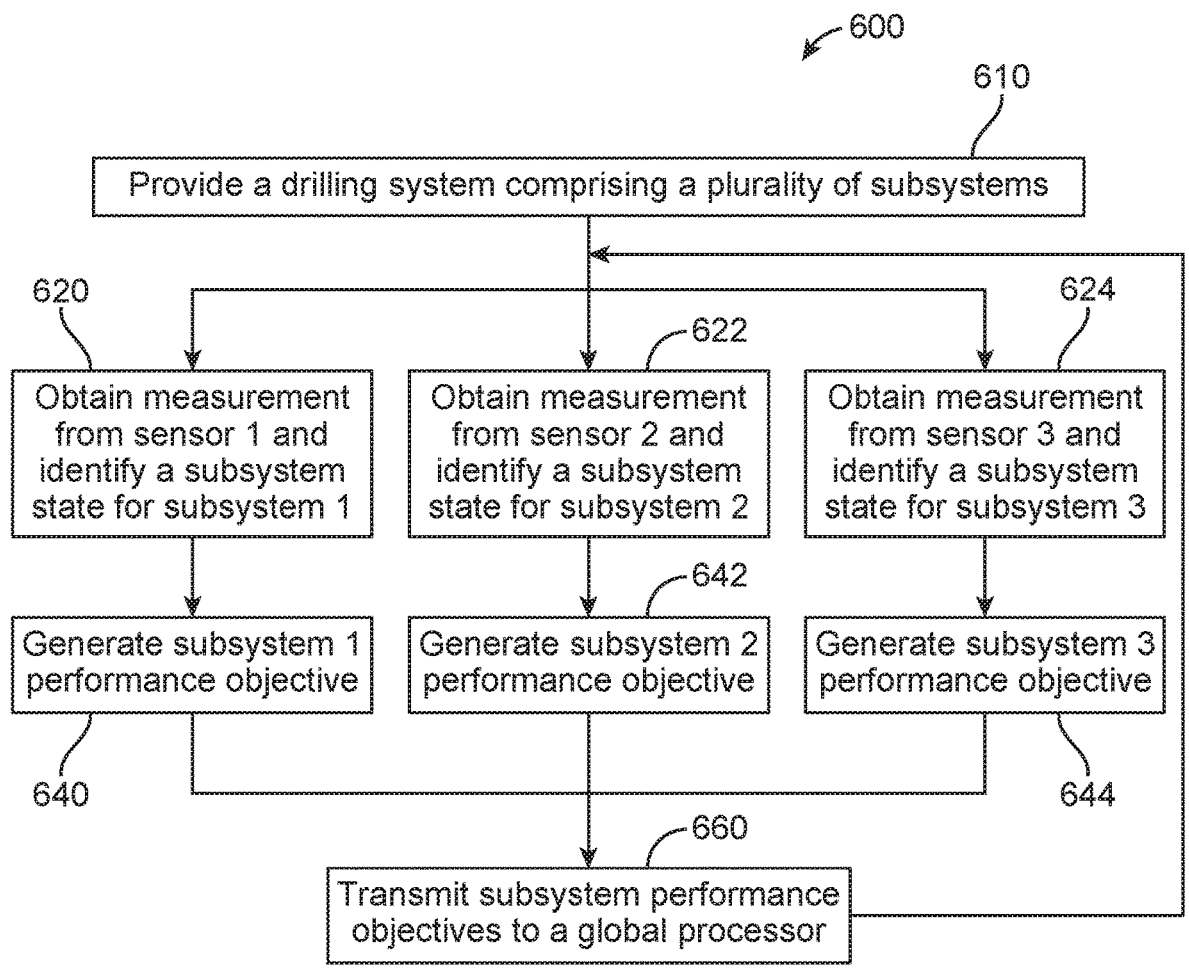
FIG. 6 is a flow chart illustrating a method for obtaining a plurality of subsystem performance objectives according to the disclosure herein.
Figure 7:
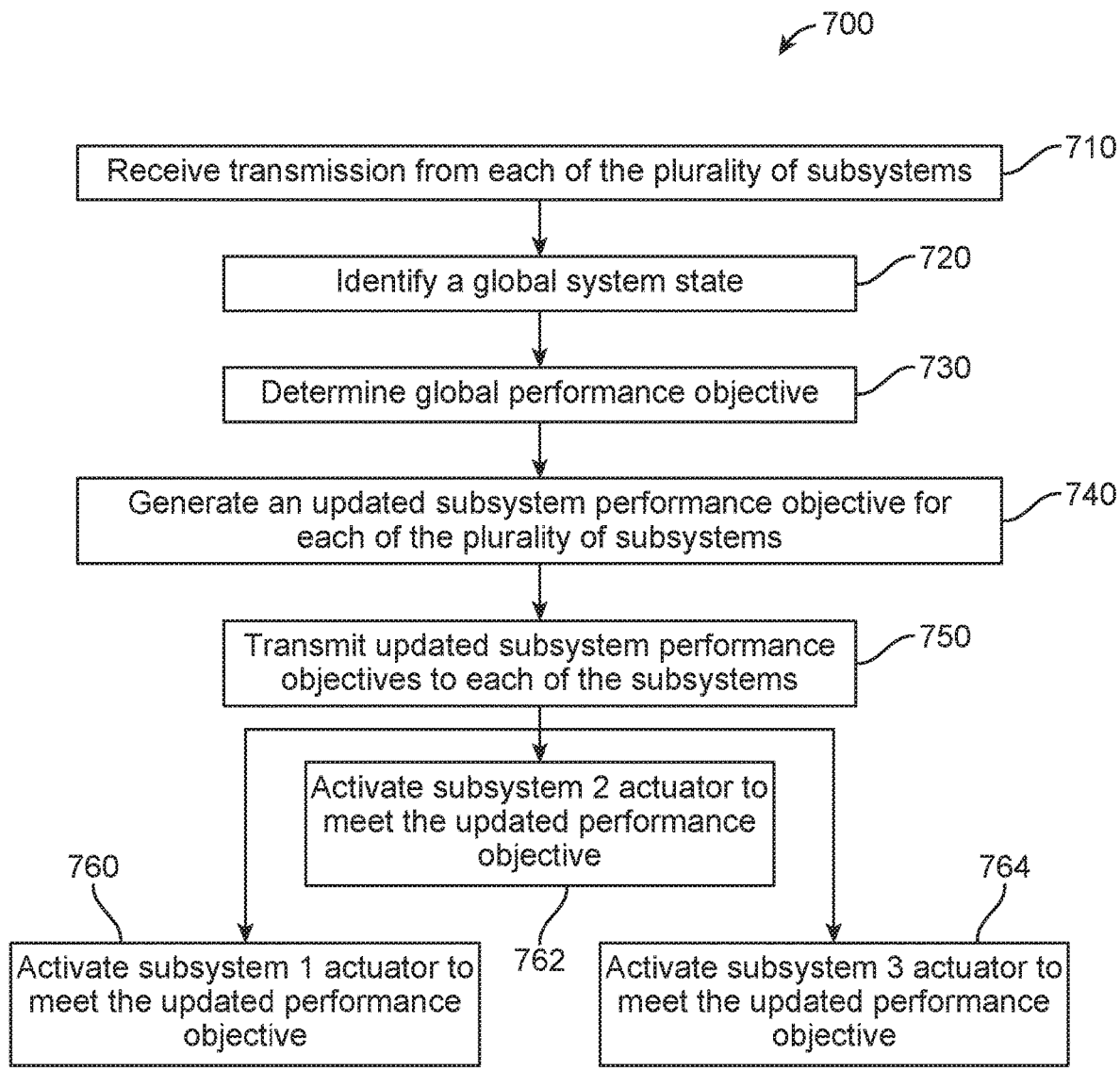
FIG. 7 is a flowchart illustrating a method for updating subsystem performance objectives according to the disclosure herein.

An alternative method for distributed control of a drilling system can follow the flow diagrams as depicted in FIGS. 6 and 7. A method 600 for localized control is shown in FIG. 6. For example, beginning at block 610, a drilling system is provided comprising a plurality of subsystems, as described above with respect to FIG. 5. While the illustrated example shows a drilling system comprising three subsystems, it should be noted that any number of subsystems can be present. At block 620, a sensor of subsystem 1 obtains a measurement and the processor identifies a subsystem state for subsystem 1 based at least in part on the obtained measurement. The measurement taken by the sensor can be, but is not limited to, hook load, top-drive torque, pump/choke, pressure/opening, BHA tool-face, and rotational position and speed. At block 640, the subsystem 1 processor generates a performance objective for subsystem 1.

Similarly, at block 622 a measurement is obtained from the sensor of subsystem 2 and a subsystem state is identified. At block 642, a subsystem performance objective is generated for subsystem 2. The same process occurs at blocks 624 and 644 with respect to subsystem 3. At block 660, the performance objectives of subsystems 1, 2, and 3 are transmitted to a global processor. The method repeats itself such that the subsystem state and subsystem performance objective for each subsystem is continuously updated.

A method 700 for distributed control through a global processor is shown in FIG. 7. For example, beginning at block 710 the global processor receives a transmission of subsystem performance objectives from each of subsystems 1, 2, and 3. At block 720, the global processor uses the subsystem performance objectives, as well as other data, to identify a global system state. At block 730, the global processor uses the global system state to determine a global performance objective. At block 740, the global processor generates an updated subsystem performance objective for each of subsystems 1, 2, and 3. The updated performance objective can be oriented to maximize an overall drilling system parameter while allowing the subsystems to avoid detrimental competition of shared resources. At block 750, the updated subsystem performance objective for each subsystem is transmitted to the corresponding subsystem. At block 760, the actuator of subsystem 1 is activated such that it changes a subsystem parameter to allow the subsystem to meet the new performance objective. Similarly, the actuators of subsystems 2 and 3 are activated at blocks 762 and 764, respectively, to allow subsystems 2 and 3 meet the new performance objectives. The above described process can repeat on a continuous loop, such that the global processor is constantly updated with the real-time data from each of the subsystems.

EXAMPLES

The following examples are provided to illustrate the subject matter of the present application. The examples are not intended to limit the scope of the present disclosure and they should not be so interpreted. The data presented in the following examples was synthesized for the purpose of demonstration.

Example 1—Modeling and Decomposition

In determining a networked control strategy, a complex model can first be identified for the system as a whole and then decomposed into a group of interaction models for each subsystem. In the alternative a group of interaction models for each subsystem can be identified directly from the data. An identified complex model for the overall drilling dynamics can be defined by Equation 1.

$$\dot{X}=F(X,U) \qquad (1)$$

Wherein X includes the surface, downhole, and fluid states involved in the drilling dynamics and U includes the surface, downhole and fluid system inputs. Model decomposition can be adopted to decompose the complex model into a set of physically meaningful subsystem interaction models. An exemplary interaction model for rig subsystem can be defined in Equation 2.

$$\dot{x}_d=f_d(x_m,u_d,x_d) \qquad (2)$$

Wherein $x_d$ denotes the drilling dynamics state, for example, rotational and translational position and velocity along the drilling pipe and at the drilling bit; $u_d$ denotes the rig surface system inputs, for example, hook load and surface torque; $x_m$ denotes the fluid dynamics states, for example, flow rate through drill bit, pressure inside and outside the drill string, fluid density and viscosity, etc. Due to the presence of $x_m$ in Eqn. 2, it is shown that the force generated by the fluid impacts the drilling dynamics.

An interaction model for fluid dynamics, such as those involved in the mud circulation system, can be defined by Equation 3.

$$\dot{x}_m = f_m(x_m, u_m, x_d) \quad (3)$$

Wherein $u_m$ denotes inputs from the mud circulation system, for example, pump pressure, flow rate, and choke opening. The force oriented from the drill pipe rotational seed and ROP, shown in Eqn. 3 as $x_d$, can impact the upstream choke pressure and flow rate through the drill bit.

In this example, the choke opening is controlled in order to regulate the downhole pressure. These parameters are entered into Eqn. 3 using Equations 4-7, below.

$$\frac{V_d}{\beta_d} \dot{p}_p = q_p - q_{bit} \quad (4)$$

$$M \dot{q}_{bit} = p_p - p_c - F(q_{bit}, \omega_d) + (\rho_d - \rho_a) g h_{dh} \quad (5)$$

$$\frac{V_a}{\beta_a} \dot{p}_c = q_{bit} + q_{bpp} - A_d v_d - q_c + q_{err} \quad (6)$$

$$q_c = K_c \sqrt{p_c - p_{c0}} G(u_c) \quad (7)$$

Wherein

| | |
|---|---|
| $p_p$ | Main pump pressure |
| $p_c$ | Upstream choke pressure |
| $p_{co}$ | Downstream choke pressure |
| $q_{bit}$ | Flow rate through the drilling bit |
| $q_p$ | Main pump flow rate |
| $q_{bpp}$ | Back pressure pump flow rate |
| $q_c$ | Flow rate through the choke |
| $u_c$ | Control input, choke opening |
| $q_{err}$ | Model uncertainty variable, unmodelled flow rate in the annulus including possible drilling mud or influx of reservoir fluids |
| $v_d$ | Drilling string velocity relative to the well |
| $\omega_d$ | Rotational velocity of the drill string |

The system described above only takes the effect of the mud subsystem state, input, and constraints, and drilling subsystem state into consideration. In order to include the BHA subsystem, Equation 8 can be used.

$$\dot{x}_B = f_B(x_B, u_B, x_d, x_m) \quad (8)$$

Wherein $u_B$ denotes the inputs of the BHA navigation system, for example, the toolface and mud motor flow rate, and $x_B$ denotes the BHA position and attitude states. The presence of $x_d$ and $x_m$ indicate that the WOB force and flow rate at drill bit impact the BHA direction and position.

During drilling operations, a short term linear model can be used to approximate the dynamics, as shown in Eqns. 2-8, in order to take various elements into account. For example, change relative to subsystem dynamics, or wear on bit. As such, Eqns. 2-8 can be rewritten for each subsystem as shown below in Equation 9.

$$\dot{X}_{ij} = A_{ij} X_{ij} + B_{ij} U_j \quad (9)$$

Wherein $X_{ij}$ denotes interaction states that reflect the impact of input from subsystem j ($U_j$) onto the original states of subsystem i. For example, Eqn. 9 can be used to evaluate the interaction dynamics between the mud circulation system and the drilling system, wherein $X_{ij}$ denotes the interaction states (such as drill string, bit translation, rotational position, and rotational speed) which reflect the input from the mud circulation system (such as pump pressure, flow rate, and choke opening).

The model described above can be initialized based on the offset data or from the first principles, and can be modified adaptively to capture the drilling dynamics. For example, with the same real-time surface inputs, the residues between the visual outputs from the current model and the real bit outputs are larger than a predefined threshold, the system identification can be triggered and the drilling model updated.

In the alternative, if an eigenvalue drift is adopted as the performance metric, the modeling and decomposition module will learn the eigenvalue changes for the current model structure from the current data. If the changes exceed a predefined limit, the model structure can be re-identified. Furthermore, a set of linear approximations can be evaluated by the eigenvalue drifts from both current and past data and whichever is more robust to changes and disturbances can be selected. As the drilling operation conditions (such as the bit wear, motor wear, and rock mechanics) change slowly, the model parameters are updated less frequently to maintain a pre-specified accuracy.

Example 2—Distributed Control

Once an interaction model has been determined for each subsystem, the data can be transmitted to a corresponding computation processor for local optimal controller design. For the purposes of this Example, an MPC controller is used. The controller design can be configured to accept local constraints and real-time physical inputs from each of the plurality of subsystems. At each step, the subsystem controllers search for the subsystem's best control command in order to advance the overall objective function. The system can be set up to achieve a variety of different overall system objectives, for example cost minimization, equipment wear reduction, or a combination of several different objectives.

For the purposes of this Example, the overall system objective is set as cost minimization. The cost minimization objective can be defined as shown in Equation 10.

$$c(u) = \int a_1 (ROP - ROP^*)^2 + a_2 r_d^2 + a_3 w^2 + a_4 (E_c - E_c^*)^2 + a_5 u^2 \quad (10)$$

Wherein u denotes the inputs of each of the plurality of subsystems, $r_d$ denotes the energy dissipation ratio, w denotes the drill bit and mud motor wear, $E_c$ and $E_c^*$ denote the real and desired cutting efficiency, respectively, ROP and ROP* denote the real and desired rate of penetration, respectively, and $a_1$ to $a_5$ denote the weights that sum to 1, wherein $a_i \geq 0$ for any i. The weights, $a_i$, can be selected based on the current drilling requirement. For example, when the replacement of the drill bit and mud motor are expensive, the weight on drill bit and motor wear is of considerable value to extend the life or retain the efficiency of drill bit or mud motor.

In the alternative, when only the energy dissipation ratio is evaluated, $a_2$ is set to be 1 while the other weights are set to be zero, in order to narrow the cost minimization function to minimize the energy dissipation ratio. The energy dissipation ratio is the ratio between the surface energy and the effective drill bit working energy. Surface energy can be calculated from the surface hook load and pump rate, and effective drill bit working energy is calculated from ROP and the planned well path.

In real-time, the cooperative and distributed controllers would achieve the overall objective as follows. Assuming, for the purposes for this Example, a cost function as described by Eqn. 10, at each time step, each of the plurality of subsystems searches for its entire local input region $\Omega_i$ to minimize cost via the MPC method. The most beneficial control input for the ith subsystem can be expressed as shown in Equation 11.

$$U_i^* = \arg\min_{U_j \in \Omega_j} C, \text{under local constraints} \quad (11)$$

The controller design for each subsystem can be performed in parallel, however each subsystem can be performed at a different rate, allowing for distributed control. Each calculated local optimal input, for example, rig inputs, pump and choke inputs, and BHA inputs, can be transmitted to a global processing module for further calculation.

Example 3—Global Optimization

A global processing module can collect local optimal inputs $U_i^*$ from each subsystem. Once the data is complied, a simple iteration of weighted summation of functions of all the $U_i^*$ is performed to guarantee the convergence of $U^* = [U_1^*, U_2^*, \ldots, U_N^*]$ to the optimal global input $U^{} = [U_1^{}, U_2^{}, \ldots, U_N^{}]$. The corresponding component of $U^{**}$ (for example, rig inputs, pump and choke inputs, and BHA inputs) can be applied to each of the subsystems via local controllers. Such controllers can be, for example, a proportional-integral-derivative (PID) controller.

Example 4—Smart Communication

A smart model communication scheme can be used to determine the time required to updated models for each subsystem by evaluating the system's performance. The closed loop performance of each subsystem can be evaluated in real-time and performance index of each subsystem can be one of eigenvalue drift or control performance.

Figure 8A:
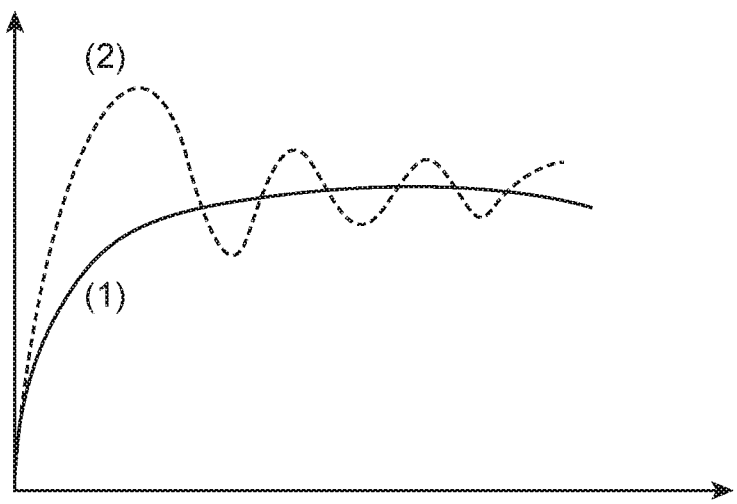
FIG. 8A illustrates a close loop response.
Figure 8B:
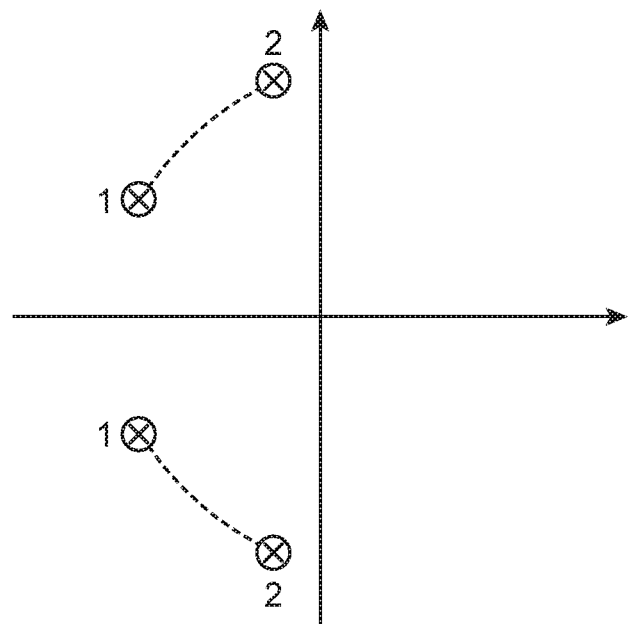
FIG. 8B illustrates a eigenvalue drift.

FIG. 8A shows an example of when a subsystem's control performance degrades from (1) to (2). As shown, interaction model for the system no longer matches the actual system output, thus an immediate communication can be adopted in order to update the interaction model. This type of degradation can also indicate that the closed loop eigenvalues have drifted closer to the imaginary axis, as shown in FIG. 8B.

Figure 9A:
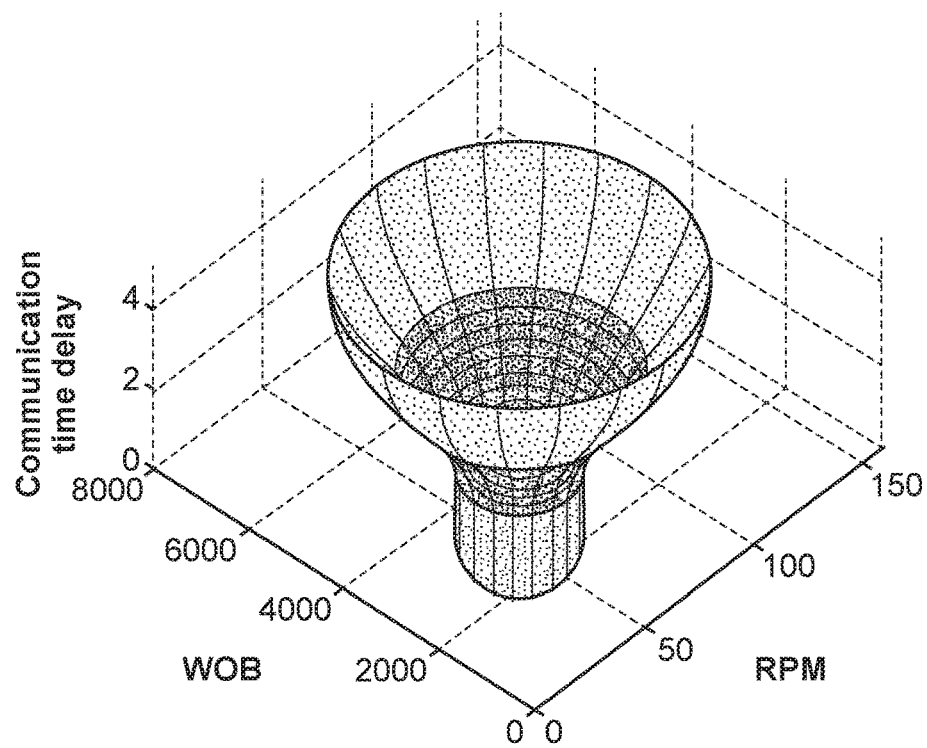
FIG. 9A illustrates a performance region vs. communication delay graph.
Figure 9B:
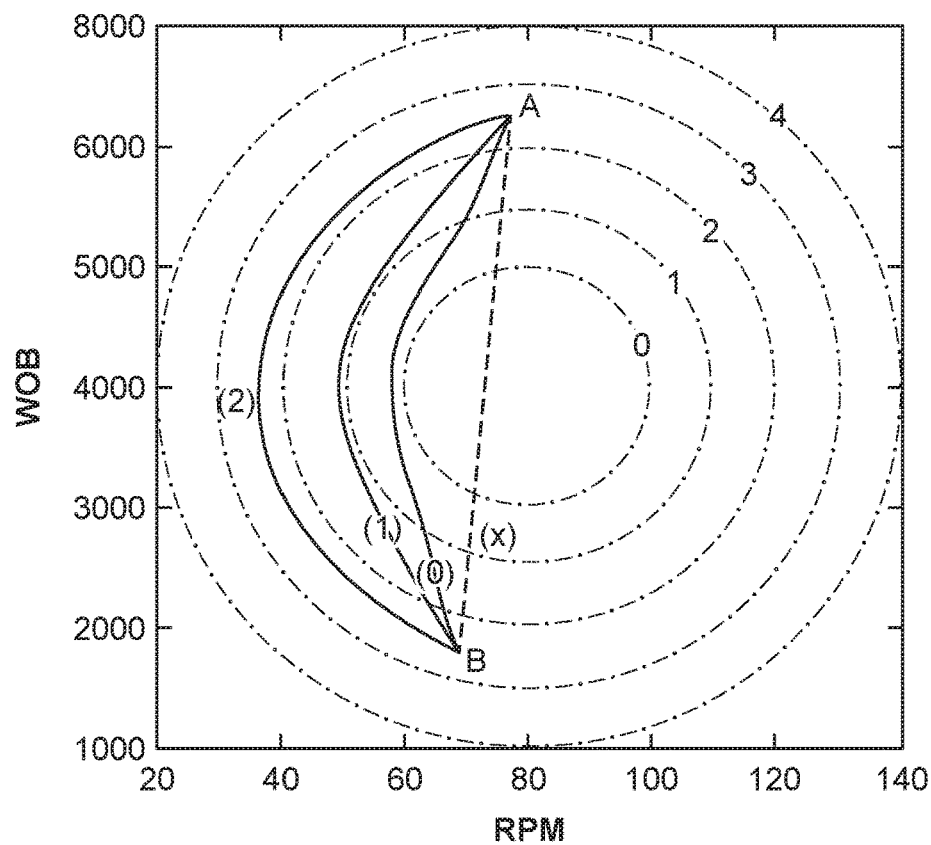
FIG. 9B illustrates an adaptive operation profile vs. communication delay.

In the alternative, the distributed system's performance may be sensitive to communication time delay. In order to reduce the impact of the delay to the system's performance a smart input/communication scheme can be included. An example of the impact of one subsystem's inputs on the overall system performance is shown in FIG. 9A. The volume within the cylinder of FIG. 9A denotes the undesired system operation region, for example, the surface operation region that could induce stick-slip (an action characterized by the absorption and release of energy as a function of the difference between static and dynamic friction). The undesired region can vary as a function of the communication time delay. FIG. 9B shows a contour figure corresponding to FIG. 9A. For the purposes of FIG. 9B, assume the rig subsystem is at current operation point A and the next calculated operation point is B, the transition path cannot be a straight path (x) as shown in FIG. 9B, because it would travel through the undesired region (as shown in FIG. 9A) and introduce problems to the system, for example, stick-slip.

When no communication delay is present, the shortest transition path (0) can be adopted as the communication/input operation profile, to circumvent the undesired region. As the communication delay increases, the undesired region expands correspondingly. Therefore, when the communication delay time increases, the communication/input operation profile is adaptively adjusted. For example, in the presence of communication delay time 1, the shortest path (1) is adopted as the profile to circumvent the undesired region 1. Similarly, when communication delay time 2 occurs, the shortest path (2) is adopted as the profile to circumvent the undesired region 2.

Figure 10:
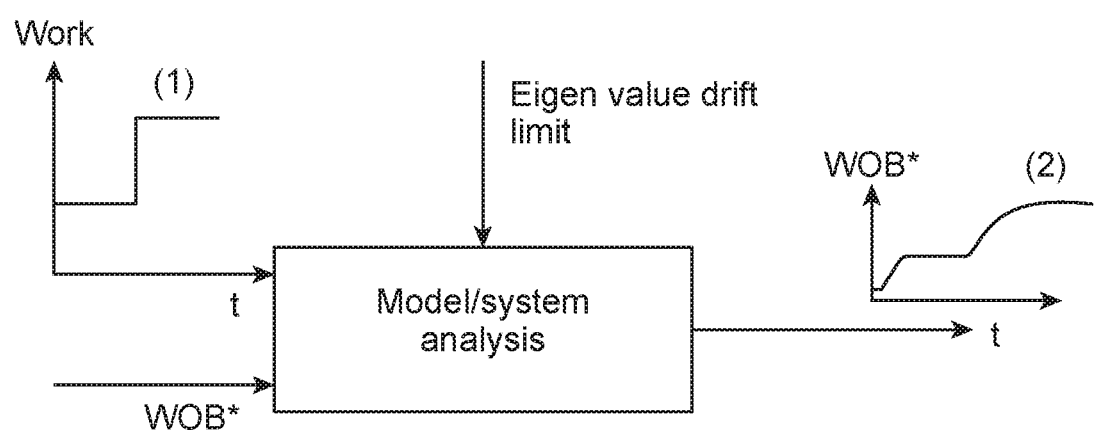
FIG. 10 illustrates an adaptive operation profile based on eigenvalue drift analysis.

In the alternative to the operation region-communication delay relationship, the eigenvalue drift-communication delay relationship can be adopted in order to determine the communication/input operation profile. The profile can be designed under the allowed eigenvalue drift, as shown in FIG. 10, wherein the profile (1) of WOB* is adapted to profile (2) to satisfy the eigenvalue drift constraints associated with the current communication delay.

When the subsystems are weakly coupled, real-time communication is not necessary until the subsystem's structure is changed into a closely coupled fashion. In the alternative, if the subsystems are closely coupled the communication bandwidth does not allow real-time communication among them; however each subsystem controller is designed with robust techniques such that the controlled system can tolerate the communication delay.

Numerous examples are provided herein to enhance understanding of the present disclosure. A specific set of statements are provided as follows.

Statement 1: A system comprising a plurality of subsystems comprising a subsystem controller communicatively coupled with a sensor, an actuator, and a subsystem processor, wherein the sensor obtains a measurement, and wherein the subsystem processor further comprises a first memory storing instructions which cause the subsystem processor to identify a subsystem state, and generate a subsystem performance objective based at least in part on the subsystem state; and a global processor communicatively coupled with each of the plurality of subsystems, the global processor comprising a second memory storing instructions which cause the global processor to identify a global system state based at least in part on the subsystem state of each of the plurality of subsystems, generate a global performance objective based at least in part on the global system state, calculate an updated subsystem performance objective for each of the plurality of subsystems, and transmit the updated subsystem performance objective to each of the plurality of subsystems; and wherein the subsystem controller in each of the plurality of subsystems activates the actuator to adjust a subsystem parameter to meet the updated subsystem performance objective.

Statement 2: A system according to Statement 1, wherein each of the plurality of subsystems are one of a rig subsystem, a drilling fluid subsystem, and a bottom hole assembly (BHA) subsystem.

Statement 3: A system according to Statement 1 or Statement 2, wherein the measurement taken by the sensor of the BHA subsystem is selected from the group consisting of a formation resistivity near the drill bit, a formation gamma ray intensity, a formation porosity, a formation lithology, an inclination of the drill string, an azimuth of the drill string, a downhole fluid pressure, a shock, a vibration, a torque, a revolution per minute (RPM) of the fluid-driven motor, a change in torque of the fluid-driven motor, a change in power of the fluid-driven motor, a drill string telemetry, and a drill bit telemetry.

Statement 4: A system according to Statements 1-3, wherein the sensor of the BHA subsystem is selected from the group consisting of an acoustic logging tool, a neutron logging tool, a gamma ray logging tool, a density logging tool, a photoelectron logging tool, and a nuclear magnetic resonance (NMR) logging tool.

Statement 5: A system according to Statements 1-4, wherein the subsystem parameter controlled by the actuator of the BHA subsystem is selected from the group consisting of a well path, a drill bit orientation, a path, a steering, and a drill string orientation.

Statement 6: A system according to Statements 1-5, wherein the subsystem controller of the BHA subsystem transmits measurements obtained from the sensor to the global processor.

Statement 7: A system according to Statements 1-6, wherein the measurement taken by the sensor of the drilling fluid subsystem is selected from the group consisting of a drilling fluid flow rate, a drilling fluid pump rate, a volume of cuttings, a lithology of cuttings, a quantity of cuttings, a weight of cuttings, a density of cuttings, a shape and morphology of cuttings, a visual characteristics of cuttings, a particle size distribution (PSD) of cuttings, a weight and volume of fines, a PSD of fines, a drilling fluid rheology, a drilling fluid density, an electrical stability of the drilling fluid, a percent solids, an oil to water ratio, a drilling fluid pH, a drilling fluid salinity, and a PSD of the drilling fluid.

Statement 8: A system according to Statements 1-7, wherein the subsystem parameter controlled by the actuator of the drilling fluid subsystem is selected from the group consisting of a drilling fluid pumping rate, a drilling fluid flow rate, a shaker screen desk angle, a shaker vibration, a shake G-force, a cutting conveyance velocity, a drilling fluid composition, a drilling fluid additive supply valve, a drilling fluid additive feed rate, and a drilling fluid discharge rate.

Statement 9: A system according to Statements 1-8, wherein the measurement taken by the sensor of the rig subsystem is selected from the group consisting of a revolution per minute (RPM), a weight-on-bit (WOB), a torque-on-bit (TOB), a rate of penetration (ROP), a well depth, a hook load, and a standpipe pressure.

Statement 10: A system according to Statements 1-9, wherein the subsystem parameter controlled by the actuator of the rig subsystem is selected from the group consisting of an RPM, a WOB, a TOB, an ROP, and a hook load.

Statement 11: A system according to Statements 1-10, wherein the subsystem controller transmits a plurality of control signals to the actuator.

Statement 12: A system according to Statements 1-11, wherein the global performance objective is one of a cost minimization, an equipment life extension, and a combination thereof.

Statement 13: A method comprising providing a drilling system comprising a plurality of subsystems, each of the plurality of subsystems comprising a subsystem controller communicatively coupled with a sensor, an actuator, and a subsystem processor; obtaining, at the sensor, a measurement; identifying, at each of the subsystem processors, a subsystem state; generating, at each of the subsystem processors, a subsystem performance objective; providing a global processor communicatively coupled with each of the plurality of subsystems; transmitting, from each of the subsystem controllers, the subsystem state and the subsystem performance objective to the global processor; identifying, at the global processor, a global system state based at least in part on the subsystem state of each of the plurality of subsystems; determining, at the global processor, a global performance objective; generating, at the global processor, an updated subsystem performance objective for each of the plurality of subsystems; transmitting, from the global processor, the updated subsystem performance objective to each of the plurality of subsystems; and activating, at each of the plurality of subsystems, the actuator to adjust a subsystem parameter to meet the updated subsystem performance objective.

Statement 14: A method according to Statement 13, wherein each of the plurality of subsystems are one of a rig subsystem, a drilling fluid subsystem, and a bottom hole assembly (BHA) subsystem.

Statement 15: A method according to Statement 13 or Statement 14, wherein the measurement taken by the sensor of the BHA subsystem is selected from the group consisting of a formation resistivity near the drill bit, a formation gamma ray intensity, a formation porosity, a formation lithology, an inclination of the drill string, an azimuth of the drill string, a downhole fluid pressure, a shock, a vibration, a torque, a revolution per minute (RPM) of the fluid-driven motor, a change in torque of the fluid-driven motor, a change in power of the fluid-driven motor, a drill string telemetry, and a drill bit telemetry.

Statement 16: A method according to Statements 13-15, wherein the sensor of the BHA subsystem is selected from the group consisting of an acoustic logging tool, a neutron logging tool, a gamma ray logging tool, a density logging tool, a photoelectron logging tool, and a nuclear magnetic resonance (NMR) logging tool.

Statement 17: A method according to Statements 13-16, wherein the subsystem parameter controlled by the actuator of the BHA subsystem is selected from the group consisting of a well path, a drill bit orientation, a path, a steering, and a drill string orientation.

Statement 18: A method according to Statements 13-17, wherein the subsystem controller of the BHA subsystem transmits measurements obtained from the sensor to the global processor.

Statement 19: A method according to Statements 13-18, wherein the measurement taken by the sensor of the drilling fluid subsystem is selected from the group consisting of a drilling fluid flow rate, a drilling fluid pump rate, a volume of cuttings, a lithology of cuttings, a quantity of cuttings, a weight of cuttings, a density of cuttings, a shape and morphology of cuttings, a visual characteristics of cuttings, a particle size distribution (PSD) of cuttings, a weight and volume of fines, a PSD of fines, a drilling fluid rheology, a drilling fluid density, an electrical stability of the drilling fluid, a percent solids, an oil to water ratio, a drilling fluid pH, a drilling fluid salinity, and a PSD of the drilling fluid.

Statement 20: A method according to Statements 13-19, wherein the subsystem parameter controlled by the actuator of the drilling fluid subsystem is selected from the group consisting of a drilling fluid pumping rate, a drilling fluid flow rate, a shaker screen desk angle, a shaker vibration, a shake G-force, a cutting conveyance velocity, a drilling fluid composition, a drilling fluid additive supply valve, a drilling fluid additive feed rate, and a drilling fluid discharge rate.

Statement 21: A method according to Statements 13-20, wherein the measurement taken by the sensor of the rig subsystem is selected from the group consisting of a revolution per minute (RPM), a weight-on-bit (WOB), a torque-on-bit (TOB), a rate of penetration (ROP), a well depth, a hook load, and a standpipe pressure.

Statement 22: A method according to Statements 13-21, wherein the subsystem parameter controlled by the actuator of the rig subsystem is selected from the group consisting of an RPM, a WOB, a TOB, an ROP, and a hook load.

Statement 23: A method according to Statements 13-22, further comprising transmitting a plurality of control signals from the subsystem controller to the actuator.

Statement 24: A method according to Statements 13-23, wherein the global performance objective is one of a cost minimization, an equipment life extension, and a combination thereof.

Statement 25: A method according to Statements 13-24, further comprising repeating the method to provide a continuously updated performance objective to each of the plurality of subsystems.

Statement 26: A method comprising providing a drilling system comprising a plurality of subsystems, each of the plurality of subsystems comprising a subsystem controller communicatively coupled with a sensor, an actuator, and a subsystem processor; providing a global processor communicatively coupled with each of the plurality of subsystems; determining, at the global processor, a global performance objective; obtaining, at the each of the plurality of sensors, a measurement; transmitting, from each of the subsystem controllers, the subsystem state and the subsystem performance objective to the global processor; generating, at the global processor, a controller design; transmitting, from the global processor, the controller design to the subsystem controller for each of the plurality of subsystems; and activating, at each of the plurality of subsystems, the actuator to adjust a subsystem parameter to meet the controller design.

Statement 27: A method according to Statement 26, wherein each of the plurality of subsystems are one of a rig subsystem, a drilling fluid subsystem, and a bottom hole assembly (BHA) subsystem.

Statement 28: A method according to Statement 26 or Statement 27, wherein the measurement taken by the sensor of the BHA subsystem is selected from the group consisting of a formation resistivity near the drill bit, a formation gamma ray intensity, a formation porosity, a formation lithology, an inclination of the drill string, an azimuth of the drill string, a downhole fluid pressure, a shock, a vibration, a torque, a revolution per minute (RPM) of the fluid-driven motor, a change in torque of the fluid-driven motor, a change in power of the fluid-driven motor, a drill string telemetry, and a drill bit telemetry.

Statement 29: A method according to Statements 26-28, wherein the sensor of the BHA subsystem is selected from the group consisting of an acoustic logging tool, a neutron logging tool, a gamma ray logging tool, a density logging tool, a photoelectron logging tool, and a nuclear magnetic resonance (NMR) logging tool.

Statement 30: A method according to Statements 26-29, wherein the subsystem parameter controlled by the actuator of the BHA subsystem is selected from the group consisting of a well path, a drill bit orientation, a path, a steering, and a drill string orientation.

Statement 31: A method according to Statements 26-30, wherein the subsystem controller of the BHA subsystem transmits measurements obtained from the sensor to the global processor.

Statement 32: A method according to Statements 26-31, wherein the measurement taken by the sensor of the drilling fluid subsystem is selected from the group consisting of a drilling fluid flow rate, a drilling fluid pump rate, a volume of cuttings, a lithology of cuttings, a quantity of cuttings, a weight of cuttings, a density of cuttings, a shape and morphology of cuttings, a visual characteristics of cuttings, a particle size distribution (PSD) of cuttings, a weight and volume of fines, a PSD of fines, a drilling fluid rheology, a drilling fluid density, an electrical stability of the drilling fluid, a percent solids, an oil to water ratio, a drilling fluid pH, a drilling fluid salinity, and a PSD of the drilling fluid.

Statement 33: A method according to Statements 26-32, wherein the subsystem parameter controlled by the actuator of the drilling fluid subsystem is selected from the group consisting of a drilling fluid pumping rate, a drilling fluid flow rate, a shaker screen desk angle, a shaker vibration, a shake G-force, a cutting conveyance velocity, a drilling fluid composition, a drilling fluid additive supply valve, a drilling fluid additive feed rate, and a drilling fluid discharge rate.

Statement 34: A method according to Statements 26-33, wherein the measurement taken by the sensor of the rig subsystem is selected from the group consisting of a revolution per minute (RPM), a weight-on-bit (WOB), a torque-on-bit (TOB), a rate of penetration (ROP), a well depth, a hook load, and a standpipe pressure.

Statement 35: A method according to Statements 26-34, wherein the subsystem parameter controlled by the actuator of the rig subsystem is selected from the group consisting of an RPM, a WOB, a TOB, an ROP, and a hook load.

Statement 36: A method according to Statements 26-35, further comprising transmitting a plurality of control signals from the subsystem controller to the actuator.

Statement 37: A method according to Statements 26-36, wherein the controller design maximizes one of a cost minimization, an equipment life extension, and a combination thereof.

Statement 38: A method according to Statements 26-37, further comprising repeating the method to provide a continuously updated controller design to each of the plurality of subsystems.

Statement 39: A method according to Statements 26-38, wherein the controller design accounts for a plurality of local constraints unique to each of the plurality of subsystems.

Statement 40: An apparatus comprising a plurality of subsystems communicatively coupled with a global processor, wherein each of the plurality of subsystems comprises a controller communicatively coupled with a sensor, an actuator, and a processor, and wherein the processor further comprises a memory storing instructions which cause the processor to receive, from the sensor, a measurement, identify a subsystem state, generate, at the processor, a subsystem performance objective, transmit, from the controller, the subsystem state and the subsystem performance objective to the global processor, receive, from the global processor, an updated subsystem performance objective, and activate the actuator to adjust a parameter to meet the updated performance objective.

Statement 41: An apparatus according to Statement 40, wherein each of the plurality of subsystems are one of a rig subsystem, a drilling fluid subsystem, and a bottom hole assembly (BHA) subsystem.

Statement 42: An apparatus according to Statement 40 or Statement 41, wherein the measurement taken by the sensor of the BHA subsystem is selected from the group consisting of a formation resistivity near the drill bit, a formation gamma ray intensity, a formation porosity, a formation lithology, an inclination of the drill string, an azimuth of the drill string, a downhole fluid pressure, a shock, a vibration, a torque, a revolution per minute (RPM) of the fluid-driven motor, a change in torque of the fluid-driven motor, a change in power of the fluid-driven motor, a drill string telemetry, and a drill bit telemetry.

Statement 43: An apparatus according to Statement 40-42, wherein the sensor of the BHA subsystem is selected from the group consisting of an acoustic logging tool, a neutron logging tool, a gamma ray logging tool, a density logging tool, a photoelectron logging tool, and a nuclear magnetic resonance (NMR) logging tool.

Statement 44: An apparatus according to Statements 40-43, wherein the parameter controlled by the actuator of the BHA subsystem is selected from the group consisting of a well path, a drill bit orientation, a path, a steering, and a drill string orientation.

Statement 45: An apparatus according to Statements 40-44, wherein the controller of the BHA subsystem transmits measurements obtained from the sensor to the global processor.

Statement 46: An apparatus according to Statements 40-45, wherein the measurement taken by the sensor of the drilling fluid subsystem is selected from the group consisting of a drilling fluid flow rate, a drilling fluid pump rate, a volume of cuttings, a lithology of cuttings, a quantity of cuttings, a weight of cuttings, a density of cuttings, a shape and morphology of cuttings, a visual characteristics of cuttings, a particle size distribution (PSD) of cuttings, a weight and volume of fines, a PSD of fines, a drilling fluid rheology, a drilling fluid density, an electrical stability of the drilling fluid, a percent solids, an oil to water ratio, a drilling fluid pH, a drilling fluid salinity, and a PSD of the drilling fluid.

Statement 47: An apparatus according to Statements 40-46, wherein the parameter controlled by the actuator of the drilling fluid subsystem is selected from the group consisting of a drilling fluid pumping rate, a drilling fluid flow rate, a shaker screen desk angle, a shaker vibration, a shake G-force, a cutting conveyance velocity, a drilling fluid composition, a drilling fluid additive supply valve, a drilling fluid additive feed rate, and a drilling fluid discharge rate.

Statement 48: An apparatus according to Statements 40-47, wherein the measurement taken by the sensor of the rig subsystem is selected from the group consisting of a revolution per minute (RPM), a weight-on-bit (WOB), a torque-on-bit (TOB), a rate of penetration (ROP), a well depth, a hook load, and a standpipe pressure.

Statement 49: An apparatus according to Statements 40-48, wherein the parameter controlled by the actuator of the rig subsystem is selected from the group consisting of an RPM, a WOB, a TOB, an ROP, and a hook load.

Statement 50: An apparatus according to Statements 40-49, wherein the controller transmits a plurality of control signals to the actuator.

Statement 51: An apparatus according to Statements 40-50, wherein the global performance objective is one of a cost minimization, an equipment life extension, and a combination thereof.

Statement 52: An apparatus comprising a global processor communicatively coupled with a plurality of subsystems, wherein the global processor further comprises a memory storing instructions which cause the global processor to receive a subsystem state and a subsystem performance objective from each of the plurality of subsystems, identify a global system state based at least in part on the subsystem state of each of the plurality of subsystems, generate a global performance objective, calculate an updated subsystem performance objective for each of the plurality of subsystems, and transmit the updated subsystem performance objective to each of the plurality of subsystems.

Statement 53: An apparatus according to Statement 52, wherein each of the plurality of subsystems are one of a rig subsystem, a drilling fluid subsystem, and a bottom hole assembly (BHA) subsystem.

Statement 54: An apparatus according to Statement 52 or Statement 53, wherein the global performance objective is one of a cost minimization, an equipment life extension, and a combination thereof.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A system comprising:
a plurality of subsystems wherein each of the plurality of subsystems comprises:
a subsystem controller communicatively coupled with a sensor to obtain one or more measurements relating to the corresponding subsystem,
an actuator to adjust one or more parameters of the corresponding subsystem, and
a subsystem processor communicatively coupled with the subsystem controller, the subsystem processor further comprising a first memory storing instructions which cause the subsystem processor to:
identify a subsystem state, and
generate a subsystem performance objective based at least in part on the subsystem state; and
a global processor communicatively coupled with each of the plurality of subsystems, the global processor comprising a second memory storing instructions which cause the global processor to:
receive, from each of the plurality of subsystems, the subsystem state and subsystem performance objective;
identify a global system state based at least in part on the subsystem state of each of the plurality of subsystems,
generate a global performance objective based at least in part on the global system state, calculate a networked control strategy including an interaction model for each of the plurality of subsystems;
calculate an updated subsystem performance objective for each of the plurality of subsystems, the updated subsystem performance objective based at least in part on the interaction model for the corresponding subsystem, and
transmit the networked control strategy, the interaction model and the updated subsystem performance objective to each of the corresponding subsystems;
wherein the subsystem processor for each of the plurality of subsystems receives the updated subsystem performance objective and instructs the subsystem controller for each of the plurality of subsystems to cause the actuator to adjust the one or more parameters to meet the updated subsystem performance objective.

2. The system of claim 1, wherein each of the plurality of subsystems are selected from a rig subsystem, a drilling fluid subsystem, and a bottom hole assembly (BHA) subsystem.

3. The system of claim 2, wherein the subsystem parameter controlled by the actuator of the BHA subsystem is selected from the group consisting of a well path, a drill bit orientation, a path, a steering, and a drill string orientation.

4. The subsystem of claim 2, wherein the subsystem parameter controlled by the actuator of the drilling fluid subsystem is selected from the group consisting of a drilling fluid pumping rate, a drilling fluid flow rate, a shaker screen desk angle, a shaker vibration, a shake G-force, a cutting conveyance velocity, a drilling fluid composition, a drilling fluid additive supply valve, a drilling fluid additive feed rate, and a drilling fluid discharge rate.

5. The system of claim 2, wherein the subsystem parameter controlled by the actuator of the rig subsystem is selected from the group consisting of an RPM, a WOB, a TOB, an ROP, and a hook load.

6. The system of claim 1, wherein the subsystem controller of each of the plurality of subsystems transmits a plurality of control signs to the corresponding subsystem actuator.

7. The system of claim 1, wherein the global performance objective is one of a cost minimization, an equipment life extension, and a combination thereof.

8. A method comprising:
providing a drilling system comprising a plurality of subsystems, each of the plurality of subsystems comprising a subsystem controller communicatively coupled with a sensor, an actuator, and a subsystem processor;
obtaining, at each of the plurality of sensors, a measurement relating to the corresponding subsystem;
identifying, at each of the plurality of subsystem controllers, a subsystem state for each of the corresponding subsystems;
generating, at each of the plurality of subsystem controllers, a subsystem performance objective based at least in part on the corresponding subsystem state;
transmitting, from each of the subsystem controllers, the subsystem state and subsystem performance objective to a global processor communicatively coupled with each of the plurality of subsystems;
determining, at the global processor, a global performance objective;
generating, at the global processor, a controller design including an interaction model for each of the plurality of subsystems;
calculate, at the global processor, an updated subsystem performance objective for each of the plurality of subsystems, the updated subsystem performance objectives based at least in part on the interaction model for the corresponding subsystem;
transmitting, from the global processor, the controller design and interaction models to the subsystem controller for each of the plurality of subsystems; and
activating the actuator for one or more of the plurality of subsystems to adjust the one or more parameters of the corresponding subsystem to meet the controller design.

9. The method of claim 8, wherein each of the plurality of subsystems are selected from a rig subsystem, a drilling fluid subsystem, and a bottom hole assembly (BHA) subsystem.

10. The method of claim 9, wherein the subsystem parameter controlled by the actuator of the BHA subsystem is selected from the group consisting of a well path, a drill bit orientation, a path, a steering, and a drill string orientation.

11. The method of claim 9, wherein the subsystem parameter controlled by the actuator of the drilling fluid subsystem is selected from the group consisting of a drilling fluid pumping rate, a drilling fluid flow rate, a shaker screen desk angle, a shaker vibration, a shake G-force, a cutting conveyance velocity, a drilling fluid composition, a drilling fluid additive supply valve, a drilling fluid additive feed rate, and a drilling fluid discharge rate.

12. The method of claim 9, wherein the subsystem parameter controlled by the actuator of the rig subsystem is selected from the group consisting of an RPM, a WOB, a TOB, an ROP, and a hook load.

13. The method of claim 8, wherein the controller design maximizes one of a cost minimization, an equipment life extension, and a combination thereof.

14. The method of claim 8, further comprising repeating the method to provide a continuously updated controller design to each of the plurality of subsystems.

15. An apparatus comprising:
a plurality of subsystems wherein each of the plurality of subsystems comprises a controller communicatively coupled with:
a sensor to obtain one or more measurements corresponding to the subsystem,
an actuator to adjust one or more parameters of the corresponding subsystem, and
a processor further comprising a memory storing instructions which cause the processor to:
receive, from the sensor, the one or more measurements,
identify a subsystem state, and
generate a subsystem performance objective based at least in part on the subsystem state,
transmit, from the controller, the subsystem state and the subsystem performance objective to a global processor communicatively coupled with the controller,
receive, from the global processor, a network control strategy including an interaction model and an updated subsystem performance objective for each of the plurality of subsystems, and
activate the actuator to adjust the one or more parameters of the subsystems to meet the corresponding updated performance objective.

16. The apparatus of claim 15, wherein each of the plurality of subsystems are selected from a rig subsystem, a drilling fluid subsystem, and a bottom hole assembly (BHA) subsystem.

17. The apparatus of claim 16, wherein the parameter controlled by the actuator of the BHA subsystem is selected from the group consisting of a well path, a drill bit orientation, a path, a steering, and a drill string orientation.

18. The apparatus of claim 16, wherein the parameter controlled by the actuator of the drilling fluid subsystem is selected from the group consisting of a drilling fluid pumping rate, a drilling fluid flow rate, a shaker screen desk angle, a shaker vibration, a shake G-force, a cutting conveyance velocity, a drilling fluid composition, a drilling fluid additive supply valve, a drilling fluid additive feed rate, and a drilling fluid discharge rate.

19. The apparatus of claim 16, wherein the parameter controlled by the actuator of the rig subsystem is selected from the group consisting of an RPM, a WOB, a TOB, an ROP, and a hook load.

20. The apparatus of claim 15, wherein a global performance objective is one of a cost minimization, an equipment life extension, and a combination thereof.

* * * * *